United States Patent
Bauerle

(10) Patent No.: US 7,668,687 B2
(45) Date of Patent: Feb. 23, 2010

(54) SYSTEMS AND METHODS FOR COMPENSATING PRESSURE SENSOR ERRORS

(75) Inventor: Paul A. Bauerle, Fenton, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/105,601

(22) Filed: Apr. 18, 2008

(65) Prior Publication Data

US 2009/0222230 A1 Sep. 3, 2009

Related U.S. Application Data

(60) Provisional application No. 61/032,522, filed on Feb. 29, 2008.

(51) Int. Cl.
*G01L 27/00* (2006.01)
*F02D 13/00* (2006.01)

(52) U.S. Cl. .................. 702/138; 702/98; 123/396; 123/399

(58) Field of Classification Search .............. 702/90, 702/98, 138; 123/396, 399
See application file for complete search history.

(56) References Cited

U.S. PATENT DOCUMENTS

| 5,297,064 | A  | * | 3/1994 | Bauerle ........................ 702/98 |
| 6,739,314 | B1 | * | 5/2004 | Bauerle et al. .............. 123/396 |
| 6,997,161 | B2 | * | 2/2006 | Fuwa et al. .................. 123/345 |

* cited by examiner

*Primary Examiner*—Bryan Bui
(74) *Attorney, Agent, or Firm*—Harness, Dickey & Pierce, P.L.C.

(57) ABSTRACT

A pressure sensor compensation system for a control system of an engine includes N engine-off pressure measuring modules. The N engine-off pressure measuring modules calculate differences between pressure values of a corresponding one of N pressure sensors and others of the N pressure sensors when the engine is off. The N engine-off pressure measuring modules calculate N corresponding pressure correction values based on the differences, where N is an integer greater than one. N pressure compensating modules generate N corrected pressure values when the engine is on based on N uncorrected pressure values from the N pressure sensors and the N pressure correction values.

19 Claims, 6 Drawing Sheets

United States Patent US 7,668,687 B2

SYSTEMS AND METHODS FOR COMPENSATING PRESSURE SENSOR ERRORS

CROSS-REFERENCE TO RELATED APPLICATIONS

This application claims the benefit of U.S. Provisional Patent Application No. 61/032,522, filed on Feb. 29, 2008. The disclosure of the above application is incorporated herein by reference in its entirety.

FIELD OF THE INVENTION

The present invention relates to internal combustion engines, and more particularly to systems and method for compensating pressure sensor errors in control systems for engines.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Pressure sensors may be used by engine control systems to measure operating pressures within components of the engine. The engine control system may use the measured pressures to adjust one or more operating parameters of the engine. For example only, manifold absolute pressure (MAP), barometric pressure (BARO), supercharger inlet absolute pressure (SCIAP), and/or other pressures may be sensed to control spark timing and/or fuel to the engine.

Over time, the accuracy of one or more of the pressure sensors may degrade. If the sensed pressures are incorrectly measured, the control system will not operate the engine correctly. For example, fuel economy or vehicle driveability may be reduced and/or vehicle emissions may be increased due to less accurate pressure measurement.

SUMMARY

A pressure sensor compensation system for a control system of an engine includes N engine-off pressure measuring modules. The N engine-off pressure measuring modules calculate differences between pressure values of a corresponding one of N pressure sensors and others of the N pressure sensors when the engine is off. The N engine-off pressure measuring modules calculate N corresponding pressure correction values based on the differences, where N is an integer greater than one. N pressure compensating modules generate N corrected pressure values when the engine is on based on N uncorrected pressure values from the N pressure sensors and the N pressure correction values.

A method for compensating pressure sensors in a control system of an engine includes calculating differences between pressure values of each of N pressure sensors relative to others of said N pressure sensors when the engine is off, where N is an integer greater than one; calculating N corresponding pressure correction values based on said differences; and generating N corrected pressure values when said engine is on based on N uncorrected pressure values from said N pressure sensors and said N corresponding pressure correction values.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein.

DETAILED DESCRIPTION

Figure 1:
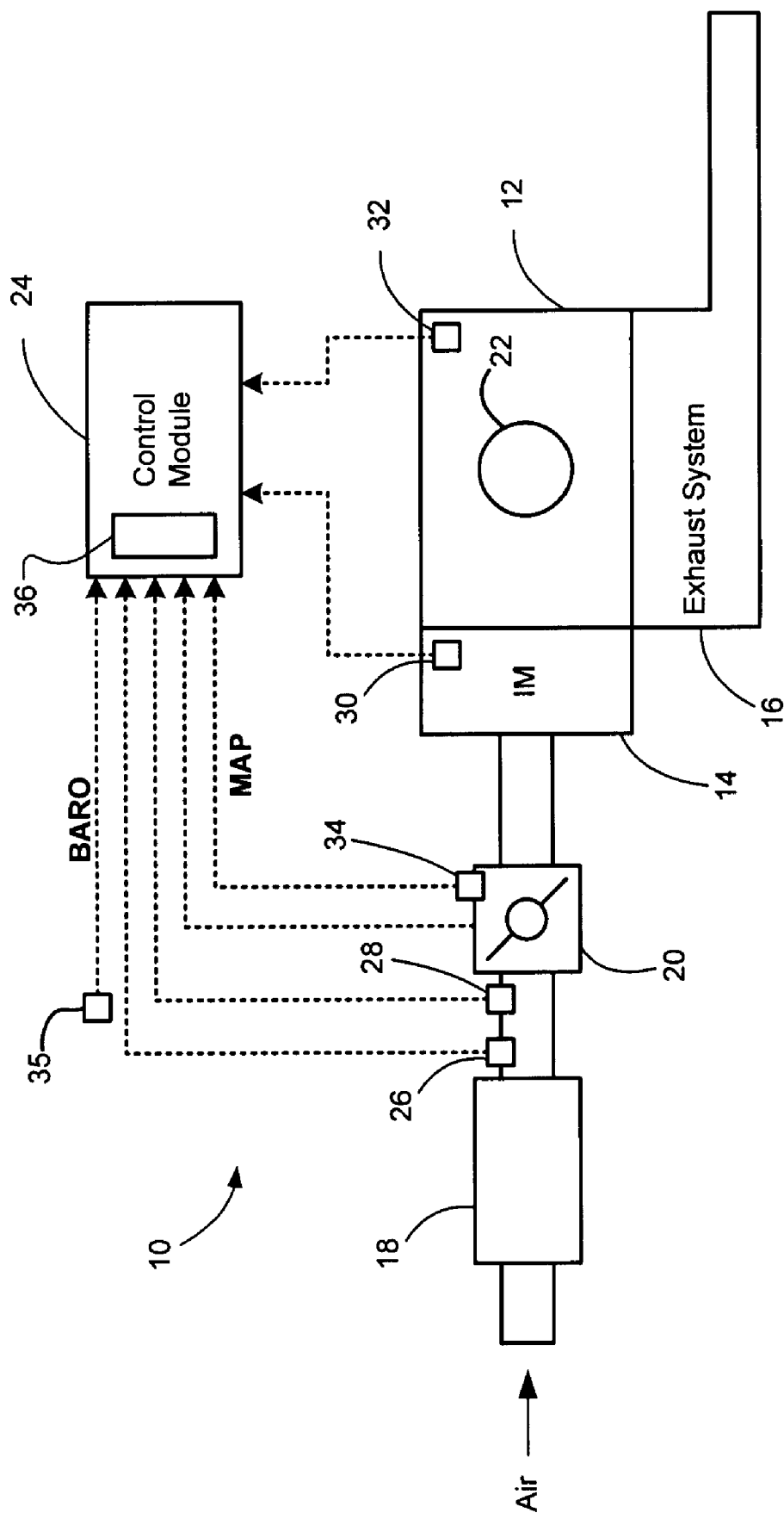
FIG. 1 is a functional block diagram of an engine system including a pressure sensor error compensation system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

While the present disclosure describes several exemplary engine configurations, the present disclosure may apply to other engines. For example only, the present disclosure may apply to compression ignition, spark ignition, homogenous spark ignition, homogeneous charge compression ignition, stratified spark ignition, and spark assisted compression ignition engines.

Referring now to FIG. 1, an exemplary engine system 10 is illustrated. The engine system 10 includes an engine 12, an intake manifold (IM) 14 and an exhaust manifold (EM) 16. Air is drawn into the intake manifold 14 through an air filter 18. A throttle 20 regulates flow of air into the engine. The throttle 20 may be an electronic throttle controller (ETC). The air is mixed with fuel to create an air and fuel mixture. The air and fuel mixture is ignited and combusted within a cylinder 22 of the engine 12 by a piston (not shown). The combustion process releases energy that is used to reciprocally drive the piston 22 within the cylinder 22. Exhaust gas generated by the combustion process is routed through the exhaust system 16 and is released. Although a single cylinder 22 is illustrated, the engine typically has more than one cylinder.

A control module 24 is provided for controlling engine components including, but not limited to, fuel injection, ignition timing, variable valve timing and peripheral components of the engine. The control module 24 may communicate with an intake air temperature (IAT) sensor 26, a mass air flow (MAF) sensor 28, a manifold absolute pressure (MAP) sensor 30, an engine RPM sensor 32, a throttle position sensor 34, and a barometric (BARO) pressure sensor 35. The control module 24 processes signals generated by these sensors 26, 28, 30, 32, 34, 35 and regulates engine operation based thereon. The control module 24 of the present disclosure may include a pressure sensor error compensation module 36 that compensates for pressure sensor errors.

Figure 2A:
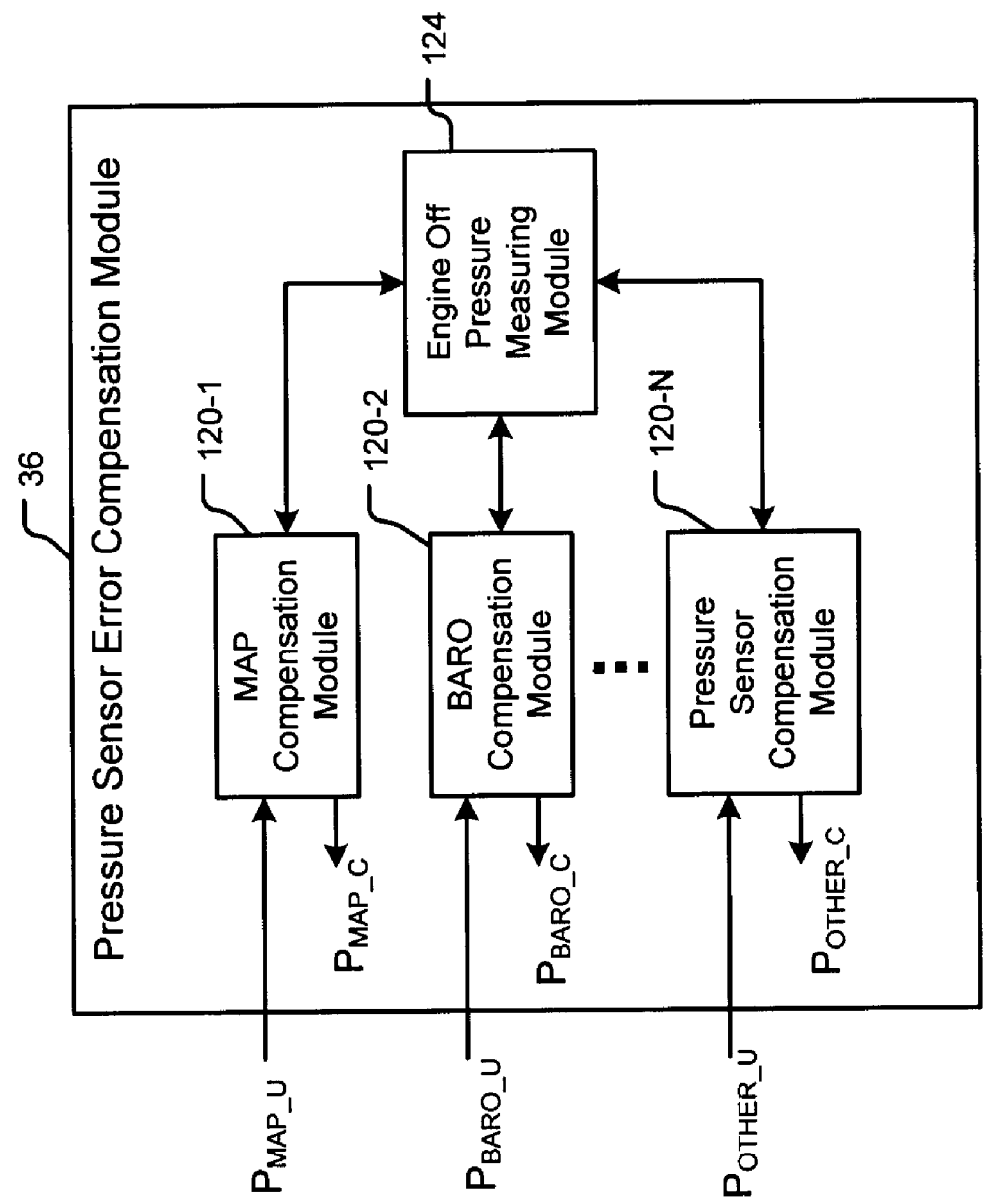
FIG. 2A is a functional block diagram of an exemplary control module according to the present disclosure.

Referring now to FIG. 2A, the pressure sensor error compensation module 36 may include one or more pressure compensation modules 120 for the pressure sensors. For example, the pressure compensation module 120-1 may compensate MAP signals, the pressure compensation module 120-2 may compensate for barometric pressure (BARO) signals, . . . , and the pressure compensation module 120-N may compensate for one or more other pressure sensor signals. The pressure compensation modules 120-1, 120-2, . . . , and 120-N may be combined into a single module.

An engine-off pressure measuring module 124 measures pressures of each of the pressure sensors a predetermined period after the engine turns off. The predetermined period may be selected to allow the measured pressure to equalize to atmospheric pressure. For example only, the predetermined period may be set to a value greater than or equal to about 4 seconds.

The engine-off pressure measuring module 124 calculates pressure differences between the pressure sensors while the pressure sensors are measuring atmospheric pressure. The engine-off pressure measuring module 124 may generate multiple measurements at spaced intervals, calculate multiple differences and then average the differences for each pair of pressure sensors. The differences for each pressure sensor relative to other sensors may be stored as single values. Alternately, an array can be generated based on the corrections for a particular atmospheric pressure. That way, the corrections can be specific to a particular pressure sensor values. Later, the array can be accessed as a function of an uncorrected sensor value. Interpolation can be used between values. When the uncorrected value is not between two array values, the closest array value may be used since interpolation under these circumstances may create incorrect adjustments.

Figure 2B:
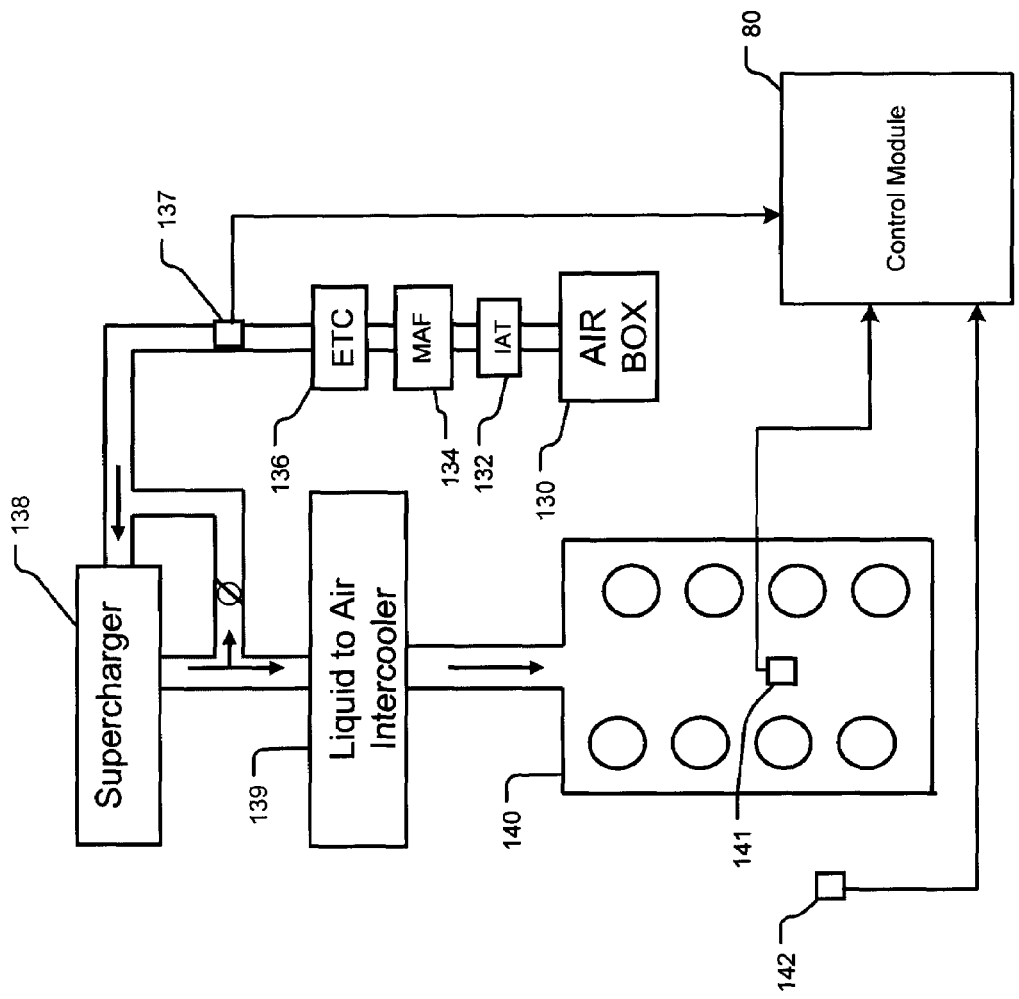
FIG. 2B is an alternate engine system with three pressure sensors according to the present disclosure.

Referring now to FIG. 2B, an exemplary engine system with three pressure sensors is shown. Air is received via an air box 130 and travels past an intake air temperature (IAT) sensor 132, which senses a temperature of the intake air. A mass airflow (MAF) sensor 134 sense mass airflow. An electronic throttle controller (ETC) 136 receives a pedal position signal from a pedal position sensor (not shown) and controls opening of the throttle. A supercharged inlet absolute pressure (SCIAP) sensor 137 senses air pressure between the ETC 136 and a supercharger 138. Charged air flows from a supercharger through a liquid-to-air intercooler 139 and an intake manifold 140. A manifold absolute pressure sensor 141 senses MAP in the intake manifold 140. A barometric pressure sensor 142 senses a barometric pressure.

Figure 3:
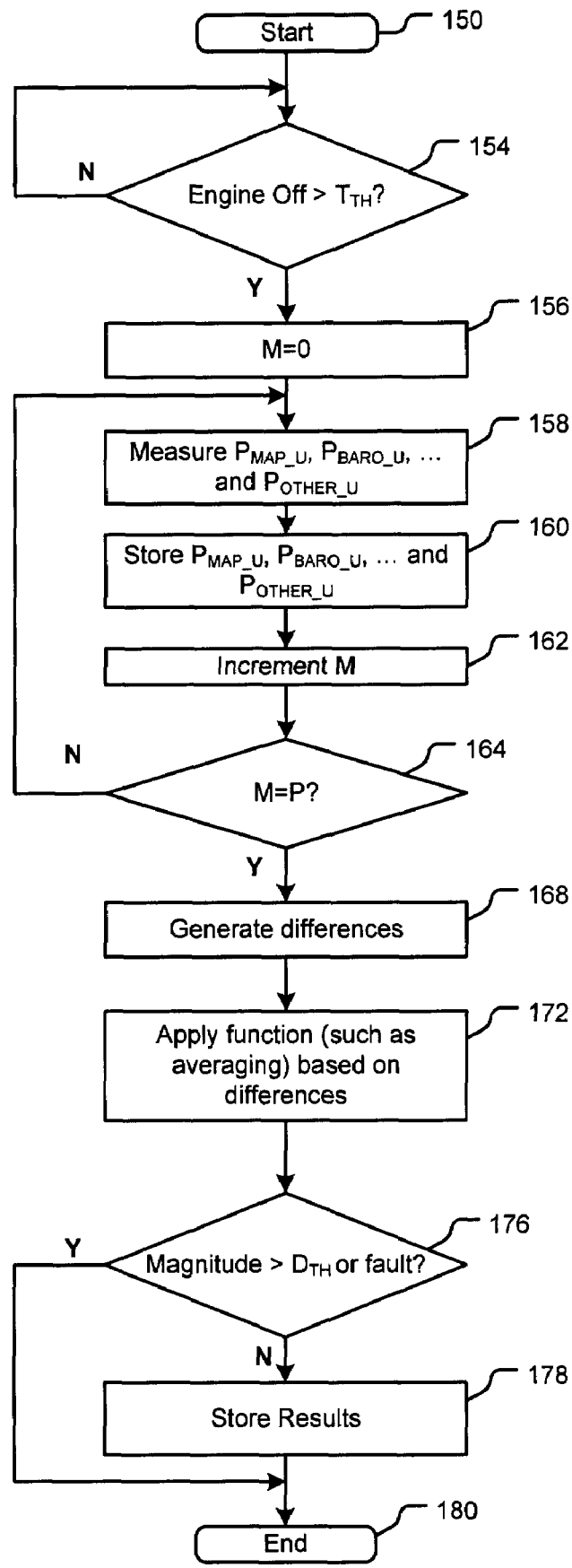
FIG. 3 illustrates steps of a method for measuring pressure differences between pressure sensors while the engine is off according to the present disclosure.

Referring now to FIG. 3, a method performed by the engine-off pressure measuring module 124 is shown. Control begins with step 150. In step 154, control determines whether the engine has been shut off for a period greater than a predetermined period. If step 154 is false, control returns to step 154. If step 154 is true, control continues with step 156 and sets M equal to zero. In step 158, control measures pressure of the sensors $P_{MAP\_U}, P_{BARO\_U}, \ldots$ and $P_{OTHER\_U}$. In step 160, control stores the values of the sensors. In step 162 control increments M. In step 164, control determines whether M is equal to P, where P is an integer equal to the number of desired iterations. If step 164 is false, control returns to step 158. If step 164 is true, control continues with step 168 and generates differences between the values for pairs of sensors ($P_{MAP\_U}-P_{BARO\_U}$, $P_{MAP\_U}-P_{OTHER\_U}$, $P_{BARO\_U}-P_{MAP\_U}$, $P_{OTHER\_U}-P_{BARO\_U}$, $P_{OTHER\_U}-P_{MAP\_U}$).

In step 172, control applies a function to the differences (such as an averaging function) generated during the iterations. In step 176, control determines whether a system fault occurs and/or whether the magnitude of the differences is greater than a predetermined difference. For example only, the predetermined difference may be set to 10 kpa. Differences greater than this may be due to other errors.

If step 176 is false, control stores the result of the function (such as an average of the differences for each iteration, (for example, $((P_{MAP\_U1}-P_{BARO\_U1})+(P_{MAP\_U2}-P_{BARO\_U2})+\cdots+(P_{MAP\_UM}-P_{BARO\_UM}))/M$, etc.) and control ends in step 180. If step 176 is true, control ends in step 180.

Figure 4:
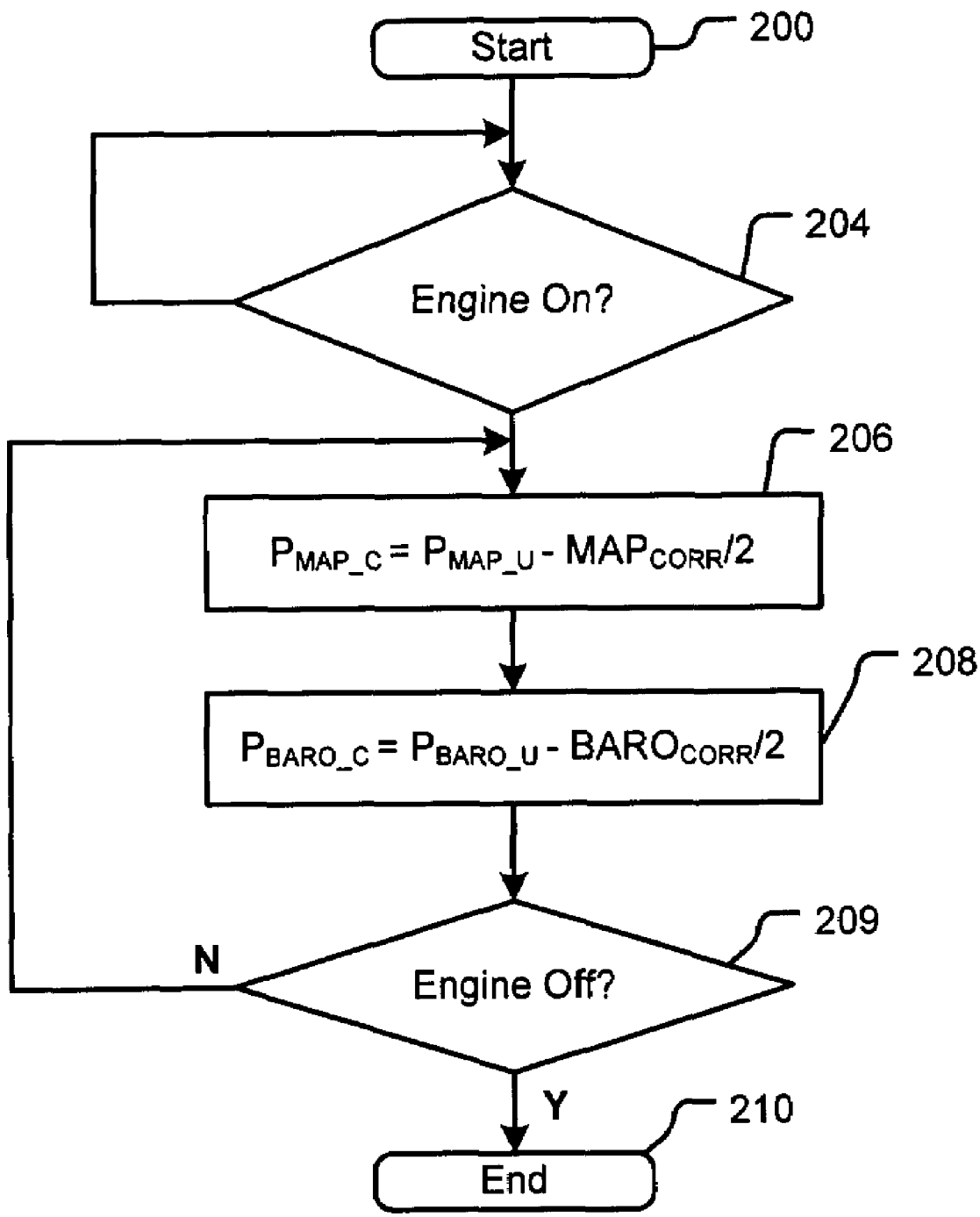
FIG. 4 illustrates steps of a method for compensating two pressure sensors according to the present disclosure.

Referring now to FIG. 4, compensation for systems with two sensors, such as MAP and BARO, is shown. Control begins with step 200. In step 204, control determines whether the engine is on. When the engine is on, control continues with step 206 and calculates a corrected map pressure $P_{MAP\_C}=P_{MAP\_U}-MAP_{CORR}/2$. $MAP_{CORR}$ is the average of the differences which is subtracted from the uncorrected sensor reading. In step 208, control calculates a corrected barometric pressure $P_{BARO\_C}=P_{BARO\_U}-BARO_{CORR}/2$. In step 209, control determines whether the engine is off. If step 209 is false, control returns to step 206 and loops through again for the next $P_{MAP\_U}$ and $P_{BARO\_U}$. If step 209 is true, control ends with step 210.

Figure 5:
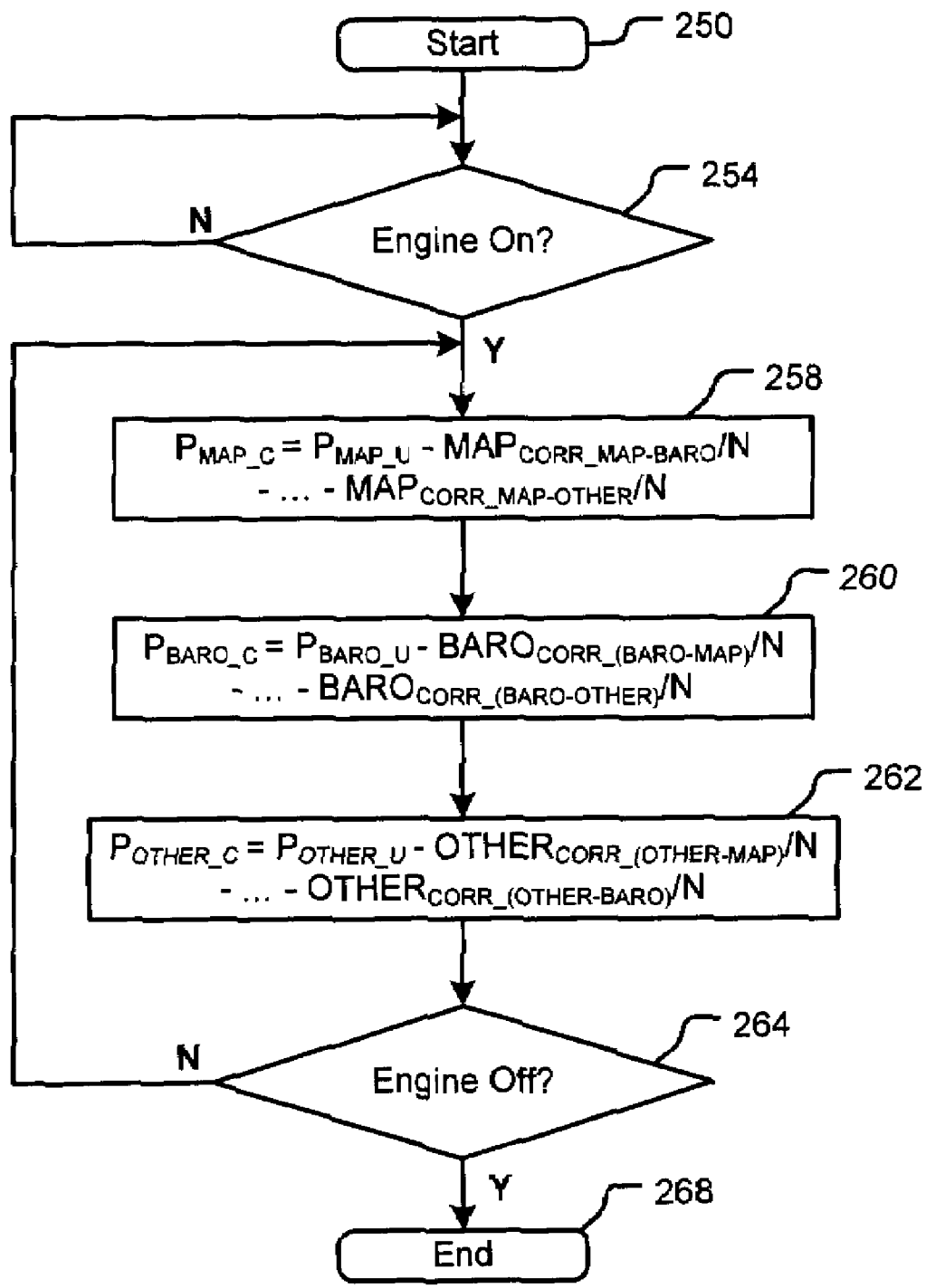
FIG. 5 illustrates steps of a method for compensating N pressure sensors according to the present disclosure

Referring now to FIG. 5, compensation for systems with N sensors is shown. Control begins with step 250. In step 254, control determines whether the engine is on. When the engine is on, control continues with step 258 and calculates a corrected map pressure $P_{MAP\_C}=P_{MAP\_U}-MAP_{CORR\_MAP\text{-}BARO}/N-\cdots-MAP_{CORR\_MAP\text{-}OTHER}/N$. In step 260, control calculates a corrected barometric pressure $P_{BARO\_C}=P_{BARO\_U}-BARO_{CORR\_(BARO\text{-}MAP)}/N-\cdots-BARO_{CORR\_(BARO\text{-}OTHER)}/N$. In step 262, control calculates a corrected pressure for the other sensors $P_{OTHER\_C}=P_{OTHER\_U}-OTHER_{CORR\_(OTHER\text{-}MAP)}/N-\cdots-OTHER_{CORR\_(OTHER\text{-}BARO)}/N$. In step 264, control determines whether the engine is off. If step 264 is false, control returns to step 258. If step 264 is true, control ends with step 210.

The following is an example applied to a three pressure sensor system. In this example, the sensors include MAP, SCIAP, and BARO. The engine-off values are 96, 97 and 99 kpa respectively. Therefore, $P_{MAP\_U}-P_{SCIAP\_U}=-1$, $P_{MAP\_U}-P_{BARO\_U}=-3$ and MAP compensation $=-(-1-3)/3=1.3$. $P_{SCIAP\_U}-P_{MAP\_U}=1$, $P_{SCIAP\_U}-P_{BARO\_U}=-2$ and SCIAP compensation$=-(1-2)/3=0.3$. $P_{BARO\_U}-P_{MAP\_U}=3$, $P_{BARO\_U}-P_{SCIAP\_U}=2$, and BARO compensation is $-(3+2)/3=-1.7$. Assuming these errors are present for the stability period: $P_{BARO\_C}=99-1.7=97.3$, $P_{SCIAP\_C}=97+0.3=97.3$, and $P_{MAP\_C}=96+1.3=97.3$.

As can be appreciated, the number of pressure differences that are generated will be based on the number N of pressure sensors. The minimum number that need to be generated is equal to $(N-1)*N/2$ since the difference for $(P_{MAP\_U}-P_{BARO\_U})$ is equal to $-(P_{BARO\_U}-P_{MAP\_U})$. Therefore, one difference may be generated for both sensors and a negative value for one of the differences may be accounted when the difference is used to correct the uncorrected pressure value. However, $(N-1)*N$ or more differences may be generated. For example, when N=2, only one difference needs to be generated. When N=3, only 3 differences need to be generated. When N=4, only 6 differences need to be generated.

The present disclosure may tend to decrease warranty costs due to false codes setting due to normal part variation and aging. Torque and airflow calculations may tend to have improved accuracy for reduced emissions, increased fuel economy and/or better drivability.

In the case of N sensors, as N becomes large, the erroneous sensor ends up getting most of the correction, and the good sensors get very little correction. Other weighting algorithms could be applied, such as a geometric mean where N is >=3.

Before the difference is calculated and stored, the raw readings may be averaged over several loops to filter out analog to digital (A/D) jitter noise. If the difference is greater than the maximum tolerance between the two sensors, a diagnostic fault may be set and the stored difference zeroed out or simply bypassed until the fault condition is removed.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A pressure sensor compensation system for a control system of an engine, comprising:
    N engine-off pressure measuring modules,
        wherein said N engine-off pressure measuring modules calculate differences between pressure values of a corresponding one of N pressure sensors and others of said N pressure sensors when the engine is off, and
        wherein said N engine-off pressure measuring modules calculate N corresponding pressure correction values based on said differences, where N is an integer greater than one; and
    N pressure compensating modules that generate N corrected pressure values when said engine is on based on N uncorrected pressure values from said N pressure sensors and said N pressure correction values.

2. The pressure sensor compensation system of claim 1 wherein said N engine-off pressure measuring modules calculate said differences over M iterations.

3. The pressure sensor compensation system of claim 1 wherein said N engine-off pressure measuring modules average said differences over M iterations.

4. The pressure sensor compensation system of claim 1 further comprising said N pressure sensors.

5. The pressure sensor compensation system of claim 4 wherein a first one of said N pressure sensors includes a manifold absolute pressure (MAP) sensor.

6. The pressure sensor compensation system of claim 4 wherein a first one of said N pressure sensors includes a barometric pressure (BARO) sensor.

7. The pressure sensor compensation system of claim 4 wherein a first one of said N pressure sensors includes a supercharger inlet absolute pressure (SCIAP) sensor.

8. The pressure sensor compensation system of claim 1 wherein said N engine-off pressure measuring modules disables use of said differences when said differences exceed a predetermined difference.

9. The pressure sensor compensation system of claim 4 wherein a first one of said N pressure sensors includes a manifold absolute pressure (MAP) sensor, and a second one of said N pressure sensors includes a barometric pressure (BARO) sensor.

10. The pressure sensor compensation system of claim 4 wherein a first one of said N pressure sensors includes a manifold absolute pressure (MAP) sensor, a second one of said N pressure sensors includes a barometric pressure (BARO) sensor, and a third one of said N pressure sensors includes a supercharger inlet absolute pressure (SCIAP) sensor.

11. A method for compensating pressure sensors in a control system of an engine, comprising:
    calculating differences between pressure values of each of N pressure sensors relative to others of said N pressure sensors using said control system when said engine is off, where N is an integer greater than one;
    calculating N corresponding pressure correction values using said control system based on said differences; and
    generating N corrected pressure values using said control system when said engine is on based on N uncorrected pressure values from said N pressure sensors and said N corresponding pressure correction values.

12. The method of claim 11 further comprising calculating said differences over M iterations.

13. The method of claim 11 further comprising averaging said differences over M iterations.

14. The method of claim 11 wherein a first one of said N pressure sensors includes a manifold absolute pressure (MAP) sensor.

15. The method of claim 11 wherein a first one of said N pressure sensors includes a barometric pressure (BARO) sensor.

16. The method of claim 11 wherein a first one of said N pressure sensors includes a supercharger inlet absolute pressure (SCIAP) sensor.

17. The method of claim 11 further comprising disabling use of said differences when said differences exceed a predetermined difference.

18. The method of claim 11 wherein a first one of said N pressure sensors includes a manifold absolute pressure (MAP) sensor, and a second one of said N pressure sensors includes a barometric pressure (BARO) sensor.

19. The method of claim 11 wherein a first one of said N pressure sensors includes a manifold absolute pressure (MAP) sensor, a second one of said N pressure sensors includes a barometric pressure (BARO) sensor, and a third one of said N pressure sensors includes a supercharger inlet absolute pressure (SCIAP) sensor.

* * * * *